United States Patent Office 2,751,374
Patented June 19, 1956

2,751,374

POLYMERIZATION OF ACRYLONITRILE

Arthur Cresswell, Stamford, Conn., assignor to American Cyanamid Company, New York, N. Y., a corporation of Maine No Drawing. Application February 1, 1951,
Serial No. 208,979

8 Claims. (Cl. 260—88.7)

This invention relates to the polymerization of acrylonitrile and more particularly, to a new process for preparing polymers and copolymers of acrylonitrile.

Polymers of acrylonitrile and its copolymers with other polymerizable organic compounds containing at least one ethylenic double bond are, of course, known. These polymers and copolymers have achieved wide use in the production of many valuable commercial products as, for example, synthetic rubber and more recently, artifical fibers.

Difficulties have been encountered in the polymerization or copolymerization of acrylonitrile, and considerable effort has been spent in the development of practicable commercial processes for preparing these extremely useful polymers and copolymers. Recent developments in the polymerization of acrylonitrile have been concerned largely with polymerization in aqueous media, such as described in U. S. Patent No. 2,135,443, and with redox catalysis which gives high yields of polymer in a short time at moderate temperatures. The color of the polymer has been good, and molecular weights have been in the desired range.

In redox or reduction-activated polymerization the catalyst system is a complex one comprising an oxidizing agent, a reducing agent, and sometimes an activator, and an oxidation-reduction reaction results in the formation of free radical intermediates. These intermediates are of such a nature that they can serve as initiators for the polymerization. Furthermore, the oxidation-reduction must occur rather slowly so as to maintain a nearly constant supply of free radicals over the course of the polymerization.

Redox systems comprising a peroxy compound and a sulphoxy compound such as, for example, ammonium persulfate and sodium bisulfite, have been used for the polymerization and copolymerization of acrylonitrile, see the Jacobson U. S. Patent No. 2,436,926 and the Brubaker and Jacobson U. S. Patent No. 2,462,354.

It is an object of the present invention to provide a new and improved process for preparing polymers and copolymers of acrylonitrile.

It is another object of the present invention to provide a new redox catalyst system useful in the polymerization and copolymerization of acrylonitrile.

It is a very important object of the present invention to provide a process for obtaining polymers or copolymers of acrylonitrile having uniform molecular weights.

The above and other objects are attained by polymerizing or copolymerizing acrylonitrile in the presence of a redox catalyst system comprising chloric acid and either sulfurous acid or hydrosulfurous acid.

The invention will be described in greater detail in conjunction with the following specific examples in which proportions are given in parts by weight unless otherwise noted.

Example 1

27.2 parts (0.5 mol) of acrylonitrile are dissolved in 416 parts of deionized water, boiled and cooled under an atmosphere of carbon dioxide. 0.043 part (0.0004 mol) of sodium chlorate, 0.101 part (0.0008 mol) of anhydrous sodium sulfite and 0.118 part (0.0012 mol) of sulfuric acid are added, and the acrylonitrile is permitted to polymerize at about 25° C. under a carbon dioxide atmosphere. An induction period of 7 minutes is observed and after 16 hours, 83% of the acrylonitrile has polymerized.

When the above example is repeated using an equivalent quantity of sodium chlorite instead of the sodium chlorate so that chlorous acid, not chloric acid, is formed by action of the sulfuric acid, no reaction is observed after 2 days, and after 6 days only about 0.25% conversion of the monomer is noted. With sodium perchlorate substituted, no reaction is observed after 2 days and only about 0.5% conversion after 4 days.

Example 2

Repetition of Example 1 but using unboiled water and carrying out the polymerization in the presence of air indicates that traces of oxygen have a certain inhibiting effect upon the catalyst system since an induction period of 16 mins. and 14 seconds and a 75.5% conversion after 19 hours are observed.

However, when the catalyst system comprises perchloric acid and other conditions are identical, no conversion takes place in 13 days.

Example 3

Example 1 is repeated using 0.0004 mol of hydrosulfurous acid ($H_2S_2O_4$) in conjunction with the chloric acid. An induction period of 2 minutes and 15 seconds and a 70.8% conversion in 24 hours are observed.

When the perchloric acid is used in place of the chloric acid in induction period of 35 minutes and about a 1.9% conversion in 24 hours are observed.

It is evident from the foregoing examples and the comparative results following each one that chloric acid in combination with sulfurous acid or hydrosulfurous acid is far more effective in initiating the polymerization of acrylonitrile than the higher and lower valence chloroxy acids, perchloric and chlorous acids.

Example 4

2500 parts of deionized water at 30° C. are placed in a suitable vessel equipped with temperature indicating means, a sealed agitator, a carbon dioxide inlet to maintain a pressure of about 2 inches above atmospheric pressure, and a connection to vacuum. The vessel is evacuated until the water starts to boil, the vessel is then filled with carbon dioxide, and the water therein is partially saturated with carbon dioxide by stirring while under slight pressure. The vessel is then re-evacuated until evolution of the dissolved carbon dioxide ceases and the vacuum is again relieved by adding carbon dioxide.

(a) 188 parts of a mixture containing 95% acrylonitrile and 5% ethyl acrylate are dissolved in the water at 30° C. 3.6 parts of sulfuric acid, 5.03 parts of sodium metabisulfite ($Na_2S_2O_5$) and 1.88 parts of sodium chlorate, in that order, are added, followed by addition of 2 parts of anhydrous sodium sulfate as a polymer flocculating agent. Polymerization temperature is maintained at 30°±0.5° C.

(b) Part (a) is repeated using half the quantities of the components of the catalyst system.

(c) Part (a) is repeated using one fourth the quantities of the components of the catalyst system.

Results observed are tabulated below. The induction and polymerization times are determined from the time of the addition of sodium chlorate since polymerization does not start until chloric acid is present. At the end of each chosen polymerization time the mixture is made slightly alkaline by addition of sodium carbonate to stop further polymerization.

| Part | Induction Period in secs. | Polymerization Time in mins. | Percent Conversion | Polymer Visc.[1] in cps. | Average Molecular Weight |
|---|---|---|---|---|---|
| (a) | none | 60 | 76 | 12.5 | 43,000 |
|     | none | 180 | 81.8 | 12.3 | 42,000 |
| (b) | 10 | 60 | 70.7 | 18.05 | 63,500 |
| (c) | 45 | 60 | 46.3 | 24.9 | 87,000 |
|     | 26 | 120 | 63.8 | 28.8 | 101,000 |
|     | 50 | 180 | 71.8 | 31.1 | 109,000 |

[1] Viscosity in centipoises at 40° C. of solution of 0.5 gram of copolymer in 50 ml. of 60% aqueous sodium thiocyanate.

It is apparent from the above that (1) for a given polymerization time the conversion or polymerization rate decreases with decrease in the concentration of the redox components, (2) the rate of conversion of polymerization decreases with time, and (3) with the same initial catalyst concentration, the average molecular weight of the copolymer increases with increase in conversion.

*Example 5*

Example 4 (c) is repeated using acrylonitrile alone, and the above relationships are confirmed.

| Induction Period in secs. | Polymerization Time in mins. | Percent Conversion | Polymer Visc. in cps. | Average Molecular Weight |
|---|---|---|---|---|
| 36 | 60 | 42 | 35.6 | 124,500 |
| 33 | 120 | 64.9 | 40 | 139,000 |
| 42 | 180 | 72.3 | 40.9 | 143,000 |

The fact that the rate of polymer formation decreases with time, while the average molecular weight of the polymer or copolymer increases with the degree of conversion, seems to indicate that the rate of reaction of the redox system is greater than the rate of polymerization and the redox components thus become exhausted more rapidly than residual monomer. The ratio of unreacted monomer to unreacted redox components therefore increases with time, thereby leading to decrease in polymerization rate and also to the formation of higher molecular weight polymers. The molecular weight of a polymer or copolymer made by my process can therefore be controlled so as to remain substantially constant throughout the entire polymerization by addition of the redox components either continuously or batchwise periodically during the polymerization at such a rate that the ratio of unreacted redox components to unreacted monomer remains constant. This rate of addition, of course, will decrease as monomer is consumed. The following examples illustrate the batchwise addition method of control.

*Example 6*

Example 4 (c) is repeated using acrylonitrile alone (as in Example 5) and adding an additional 0.625 part of sodium metabisulfiite and 0.235 part of sodium chlorate after 90 minutes of polymerization.

After 180 minutes polymerization, an 80.8% conversion is observed. The polymer has a viscosity of 31.7 cp. and an average molecular weight of 111,000. These results should be compared with those of Example 5 after the same length of time of polymerization; namely, 72.3% conversion, a viscosity of 40.9 cp. and an average molecular weight of 143,000. Thus the conversion in 180 minutes was increased by 8.5% with the second addition of redox components, and the average molecular weight was decreased.

*Example 7*

2000 parts of deionized water, 0.58 part of sulfuric acid and 150.4 parts of acrylonitrile are placed in a vessel equipped as described in Example 4 and deaerated by boiling under vacuum.

The temperature is adjusted to 35° C., 0.8 part of sodium metabisulfite dissolved in 10 parts of water is added, followed by 0.3 part of sodium chlorate similarly dissolved. The temperature is maintained at about 35° C. for a period of 150 minutes during which time additional portions of the redox components are added at intervals as follows:

| Elapsed Time in minutes | Temperature, °C. | $Na_2S_2O_5$ | | $NaClO_3$ | |
|---|---|---|---|---|---|
|   |   | Parts | Percent of monomer | Parts | Percent of monomer |
| 15 | 35.1 | 0.0960 | 0.0639 | 0.0360 | 0.0239 |
| 30 | 35.3 | 0.0852 | 0.0566 | 0.0320 | 0.0213 |
| 45 | 35.3 | 0.0780 | 0.0519 | 0.0292 | 0.0194 |
| 60 | 35.0 | 0.0684 | 0.0455 | 0.0256 | 0.0170 |
| 75 | 35.0 | 0.0612 | 0.0407 | 0.0230 | 0.0153 |
| 90 | 35.1 | 0.0540 | 0.0359 | 0.0202 | 0.0134 |
| 105 | 35.0 | 0.0480 | 0.0320 | 0.0180 | 0.0120 |
| 120 | 34.9 | 0.0432 | 0.0287 | 0.0162 | 0.0107 |
| 135 | 34.7 | 0.0384 | 0.0255 | 0.0144 | 0.0096 |

After 150 minutes, the pH is adjusted to 8.0 to stop further polymerization and the polymer is filtered, washed and dried. A 74.9% yield of a polymer having a viscosity of 26.8 cp. and a molecular weight of 93,000 is obtained.

Although the ratio of total catalyst to monomer is only 57% of that used in Example 5 the conversion of monomer is somewhat higher and the average molecular weight of polymer is lower with stepwise catalyst addition than they are with the single catalyst addition.

*Comparative Example 1*

The procedure of Example 4 is repeated using 2.82 parts of ammonium persulfate and 2.82 parts of sodium metabisulfite ($Na_2S_2O_5$) in place of the redox components there utilized. Results observed are as follows:

| Induction Period in secs. | Polymerization Time in mins. | Percent Conversion | Polymer Visc. in cps. | Average Molecular Weight |
|---|---|---|---|---|
| 5 | 5 | 10.63 | 58.7 | 207,000 |
| 9 | 60 | 70.1 | 64.5 | 226,000 |
| 10 | 120 | 86.1 | 55.7 | 195,000 |

It is evident from the above that after about 70% conversion, the average molecular weight of the polyacrylonitrile starts to drop, indicating that the next 16% of polymer is of lower molecular weight than any of the earlier-formed polymer. This is disadvantageous since it indicates that the redox reaction exhausts relatively more slowly than the supply of monomer, the ratio of unreacted redox to unreacted monomer increases, and lower molecular weights result.

*Example 8*

A number of acrylonitrile copolymers are prepared in accordance with the procedure of Example 4 (c). Polymerization is continued for 180 minutes with the following results:

| Monomer Mixture | Induction Period in secs. | Percent Conversion | Polymer Visc. in cps. | Average Molecular Weight |
|---|---|---|---|---|
| 90% acrylonitrile 10% vinyl acetate | 50 | 50.0 | 39.9 | 139,000 |
| 95% acrylonitrile 5% methyl acrylate | 26 | 69.6 | 44.0 | 153,000 |
| 90% acrylonitrile 10% vinylacetonitrile | 32.5 | 45.2 | 23.9 | 84,000 |

Example 9

A copolymer of 95% acrylonitrile and 5% methyl acrylate is prepared as follows:

558 parts of demineralized water in a jacketed kettle equipped with agitator is saturated with carbon dioxide to displace dissolved oxygen. To this are added 0.173 part of sulfuric acid and 0.84 part of sodium sulfate, the latter as a flocculating agent. Following these additions the solution is heated to 34° C. after which 40 parts of acrylonitrile and 2.1 parts of methyl acrylate are added and the reaction mixture is stirred until solution is complete.

To this monomer solution at 34° C. the catalyst components are added stepwise as tabulated below, and the temperature of the reaction mixture is maintained at 35–36° C. during polymerization by regulating the temperature of the water in the kettle jacket. The catalyst additions are as follows:

| Time, Minutes | Parts $Na_2S_2O_5$ | Parts $NaClO_3$ |
| --- | --- | --- |
| 0 | 0.2523 | 0.0932 |
| 15 | 0.0304 | 0.0112 |
| 30 | 0.0274 | 0.0101 |
| 45 | 0.0248 | 0.0091 |
| 60 | 0.0222 | 0.0081 |
| 75 | 0.0195 | 0.0072 |
| 90 | 0.0173 | 0.0064 |
| 105 | 0.0152 | 0.0056 |
| 120 | 0.0134 | 0.0049 |
| 135 | 0.0117 | 0.0044 |
| 150 | (1) | (1) |

[1] Polymerization stopped by addition of 2 parts of sodium carbonate.

After the polymerization has been stopped by adding sodium carbonate to adjust the pH of the slurry to 8, the copolymer is separated by centrifugation, followed by washing and drying. 32.5 parts of dry copolymer is obtained, corresponding to a conversion of 77%. 0.500 gram of copolymer dissolved in 50 ml. of 60% aqueous sodium thiocyanate gives a solution having a viscosity of 23.6 centipoises at 40° C. The average molecular weight is 82,000.

7.1 parts of the above copolymer are dissolved in 92.9 parts of 48.5% aqueous calcium thiocyanate solution. During mixing and subsequent operations the solution is blanketed by nitrogen. The solution, which has a pH of 6.1, is filtered and then held under vacuum until free of bubbles. The viscosity of the solution, as measured by the time for a 1/8" diameter Monel ball to fall 20 cm. through the solution at 61° C., is 27.6 seconds.

The polymer solution is heated in a steam-heated spinning head as disclosed in my copending application, Serial No. 201,823, filed December 20, 1950, now abandoned, and then extruded through a spinnerette having 40 holes of 90 microns diameter into water at 0° C. The coagulated multifilament thread is led through a cold coagulating bath for a distance of 13 feet, then to a godet which stretches the cold gel thread 25%. The gel thread is then led through a stretch bath of water at 99° C. and thence to a second godet, which imparts an additional stretch of 700%. From this second godet the thread is led to a pair of convergent heated drying rolls under such tension that the total stretch applied to the thread between the coagulating bath and the drying rolls is 880%. Before drying the thread is treated with a 1% dispersion of the diguanidinium salt of mono-octadecyl sulfosuccinate as disclosed in the copending application of Joseph J. Carnes et al., Serial No. 175,296, filed July 21, 1950, now U. S. Patent No. 2,652,348. The dry thread as delivered by the drying rolls is passed through a heated slot at 550° F. and allowed to retract 11.2% as disclosed in my copending application with Irvin Wizon, Serial No. 97,786, filed June 8, 1949, now U. S. Patent No. 2,558,733. The thread thereafter is ring-twisted 8.9 turns per inch and wound on a bobbin.

The finished multi-filament thread has the following characteristics:

| Denier | Tenacity, grams per denier | | Elongation, percent | |
| --- | --- | --- | --- | --- |
| | Dry | Wet | Dry | Wet |
| 91 | 4.94 | 5.01 | 14 | 15 |

The molecular weights given in the preceding examples are referred to elsewhere in the present specification and claims are determined by the procedure described in U. S. Patent No. 2,404,713, column 4. The specific viscosity of a 0.05 M polymer solution in dimethyl formamide is determined at 20° C. in an Ostwald-Fenske viscosimeter. From this specific viscosity the molecular weight is calculated by substitution in the Staudinger equation as given in the above reference.

The catalyst acids may be added as such or they may be formed in situ by addition as water-soluble salts, i. e., the alkali metal and ammonium salts together with an equivalent quantity of acid. An amount of from about 0.01% to about 1.0% chloric acid, based on the weight of monomer, is generally desirable. Corresponding quantities of sulfurous acid or hydrosulfurous acid depend on the amount of chloric acid used, not directly on the weight of monomer involved in the polymerization, and relative proportions by weight of about 1:2 to 1:4, chloric acid:sulfurous acid, and of about 1:1 to 1:2, chloric acid-hydrosulfurous acid, represent the optimum ranges. Figured on the basis of monomer weight, this amounts to from about 0.03% to about 3.0% sulfurous acid or from about 0.015% to about 1.5% hydrosulfurous acid. However, it will be apparent that the amount of chloric acid added is controlling. If less than the optimum quantity of sulfurous or hydrosulfurous acid is supplied, some, but not all, of the chloric acid becomes ineffective; if more sulfoxy compound is provided than necessary for the amount of chloric acid, the excess sulfoxy compound will do no harm.

My invention is primarily directed to the polymerization of polymerizable matter containing a major proportion (i. e., more than 50% by weight) of acrylonitrile and the copolymerization of acrylonitrile with up to about 15% by weight of copolymerizable monomers such as those used in Example 8, allyl alcohol, methacrylonitrile, etc., the copolymerizable compositions containing at least 85% by weight acrylonitrile. These polymers and copolymers are particularly suited and useful for fiber spinning as set out in detail in Example 9. My process is applicable, however, to copolymers of acrylonitrile with more than 15% of the indicated copolymerizable monomers as well as to copolymers of acrylonitrile with other copolymerizable monomers in any weight ratio. As a matter of fact, the process is not limited to the polymerization and copolymerization of acrylonitrile but is useful in similar processing of any polymerizable, ethylenically unsaturated monomer having a terminal $CH_2=C<$ group or mixture of such monomers. Examples include ethylene, allyl alcohol, styrene, the mono- and di-nuclear substituted methyl-, ethyl-, chloro-, amino-, nitro-styrenes, acrylic compounds generally, i. e., acrylic acid, methacrylic acid, the alkyl, aryl and aralkyl esters of acrylic and methacrylic acids, the corresponding amides and mono-N-alkyl derivatives thereof, methacrylonitrile, etc., unsaturated ketones such as methyl vinyl ketone, miscellaneous vinyl compounds such as vinyl chloride, vinyl acetate, vinyl chloracetate, vinyl butyrate, vinyl stearate, etc., and the like.

Polymerizations utilizing my new chloric acid-sulfurous or hydrosulfurous acid redox may be carried out in aqueous solution, dispersion or emulsion. When preparing polymers or copolymers of acrylonitrile for fiber spinning according to the preferred embodiment of my invention, the polymerization should be carried out in aqueous solution or dispersion in the absence of any surface active agent to avoid the complications of removing such an agent from the polymer compositions before spinning. In any case, the medium must be acid since the catalyst system will function only at a pH below 7. Thus in cases where an emulsifying agent or other surface active agent is to be used, only those which are effective in the presence of acid should be selected. Such surface active agents may be of the anionic type, i. e., sulfonated paraffin oil, alkylated naphthalene sulfonates, sodium lignosulfonate, the salts of long chain alkyl sulfates and sulfonates as, for example, sodium cetyl sulfate, sodium lauryl sulfate, alkali metal and amine soaps of long chain fatty acids, and the like, or of the cationic type, i. e., quaternary ammonium compounds such as cetyl trimethylammonium bromide, and the like.

Relatively low polymerization temperatures, those ranging from about 20° to about 70° C. are desirable. I prefer polymerization at a temperature of about 30° to about 40° C.

It is desirable to conduct the process of the present invention in the absence of oxygen which has a definite inhibiting effect on the polymerization. Suitable inert gases such as nitrogen and carbon dioxide may be used to displace air in the reaction zone.

In some cases the polymer or copolymer formed will precipitate out of solution substantially completely; in other cases it may be desirable to add a precipitating or coagulating electrolyte such as sodium chloride, sodium sulfate, aluminum sulfate, hydrochloric acid, calcium chloride, etc., to the reaction mixture. When coagulated by this or any other means the polymer is readily filtered from the liquid medium, washed and dried.

Fillers, dyes, pigments, plasticizers, other resins, both natural and synthetic, and the like may be incorporated with the polymers and copolymers prepared by my process either before, during or after polymerization to render the products more suitable for whatever use they are to be put, i. e., molding and surface coating compositions, adhesives, fibers, etc.

For the preparation of acrylonitrile polymers or copolymers to be used in the preparation of spun fibers, a uniform molecular weight of between about 60,000 and 90,000 has been found to be most desirable. It is a great advantage of my new process that by continuous addition of the catalyst system a uniform average polymer molecular weight can be attained.

When, in the claims, "polymerization" of acrylonitrile is recited, the term is of course intended to cover copolymerization of acrylonitrile with other polymerizable monomers to form copolymers just as it obviously covers polymerization of acrylonitrile, in the more restricted sense, to produce homopolymers of acrylonitrile.

I claim:

1. A process which comprises the addition polymerization of polymerizable matter containing a major proportion of acrylonitrile in the presence of an oxidation-reduction catalyst system comprising chloric acid and an acid of the group consisting of sulfurous acid and hydrosulfurous acid.

2. A process according to claim 1 in which said polymerizable matter contains at least about 85 per cent acrylonitrile by weight.

3. A process according to claim 1 in which acrylonitrile is homopolymerized.

4. A process according to claim 1 in which said catalyst system comprises from about 0.1 to about 1.0 per cent chloric acid and from about 0.03 to about 3.0 per cent sulfurous acid based on the weight of said polymerizable matter in an aqueous medium.

5. A process according to claim 1 in which said catalyst system comprises from about 0.1 to about 1.0 per cent chloric acid and from about 0.015 to about 1.5 per cent hydrosulfurous acid based on the weight of said polymerizable matter in an aqueous medium.

6. A procedure according to claim 1 which comprises maintaining the weight ratio of active catalyst components to unreacted polymerizable matter substantially constant substantially throughout the polymerization reaction by introducing additional quantities of the catalyst components after the catalytic polymerization reaction has been initiated, whereby a polymer of substantially constant molecular weight is produced substantially throughout the polymerization reaction.

7. A procedure according to claim 1 which comprises maintaining the weight ratio of active catalyst components to unreacted polymerizable matter substantially constant substantially throughout the polymerization reaction by continuously introducing additional quantities of the catalyst components after the catalytic polymerization reaction has been initiated, whereby a polymer of substantially constant molecular weight is produced substantially throughout the polymerization reaction.

8. A process which comprises polymerizing monomeric matter capable of addition polymerization and containing a major proportion of acrylonitrile in solution in an acidic aqueous medium in the presence of an oxidation-reduction catalyst system comprising a total of from about 0.01 to about 1.0 per cent chloric acid and a total of from about 0.03 to about 3.0 per cent sulfurous acid based on the weight of said monomeric matter while maintaining the weight ratio of active catalyst components to said monomeric matter substantially constant substantially throughout the polymerization reaction by introducing additional quantities of the catalyst components after the catalytic polymerization reaction has been initiated, whereby a polymer of substantially constant molecular weight is produced substantially throughout the polymerization reaction period.

References Cited in the file of this patent

UNITED STATES PATENTS

| 2,531,403 | Crouch et al. | Nov. 28, 1950 |
| 2,560,694 | Howard | July 17, 1951 |
| 2,628,223 | Richards | Feb. 10, 1953 |
| 2,673,192 | Hill | Mar. 23, 1954 |

OTHER REFERENCES

Inorganic Chemistry, by F. Ephraim, 4th Edition, Nordeman Publishing Company, New York, N. Y., page 549.